(12) United States Patent
Greenwood

(10) Patent No.: US 7,438,342 B2
(45) Date of Patent: Oct. 21, 2008

(54) TOPPER WITH RETRACTABLE DOOR FOR PICKUP TRUCKS

(76) Inventor: Peter Greenwood, P.O. Box 202, Butternut, WI (US) 54552

( * ) Notice: Subject to any disclaimer, the term of this patent is extended or adjusted under 35 U.S.C. 154(b) by 0 days.

(21) Appl. No.: 11/717,224

(22) Filed: Mar. 12, 2007

(65) Prior Publication Data

US 2008/0224495 A1    Sep. 18, 2008

(51) Int. Cl.
    *B60P 7/02*    (2006.01)
(52) U.S. Cl. .................................. 296/100.02; 296/164
(58) Field of Classification Search ............... 296/99.1, 296/100.02, 106, 164
    See application file for complete search history.

(56) References Cited

U.S. PATENT DOCUMENTS 3,376,668 A    4/1968   Smedstad
4,511,173 A    4/1985   Wentzel
4,620,743 A   11/1986   Eke
2006/0119126 A1*  6/2006   Damian .................... 296/99.1

\* cited by examiner

*Primary Examiner*—Lori L Lyjak

(57) ABSTRACT

A pickup truck topper is provided that has a retractable rear door that can be stored in a closed position and an open position. In the open position the topper rear door is stored in a horizontal position just under the roof of the topper. In the closed position the topper rear door is fastened on the rear of the pickup topper above the tailgate of the pickup. The topper has two horizontal tracks mounted on the inside of topper near the roof. The topper rear door has two rollers fasten thereon. The rollers glide in the tracks when the door moves between the closed and the open position. The topper rear door can be locked in closed position and the topper door can be locked in the fully open and retracted position.

20 Claims, 7 Drawing Sheets

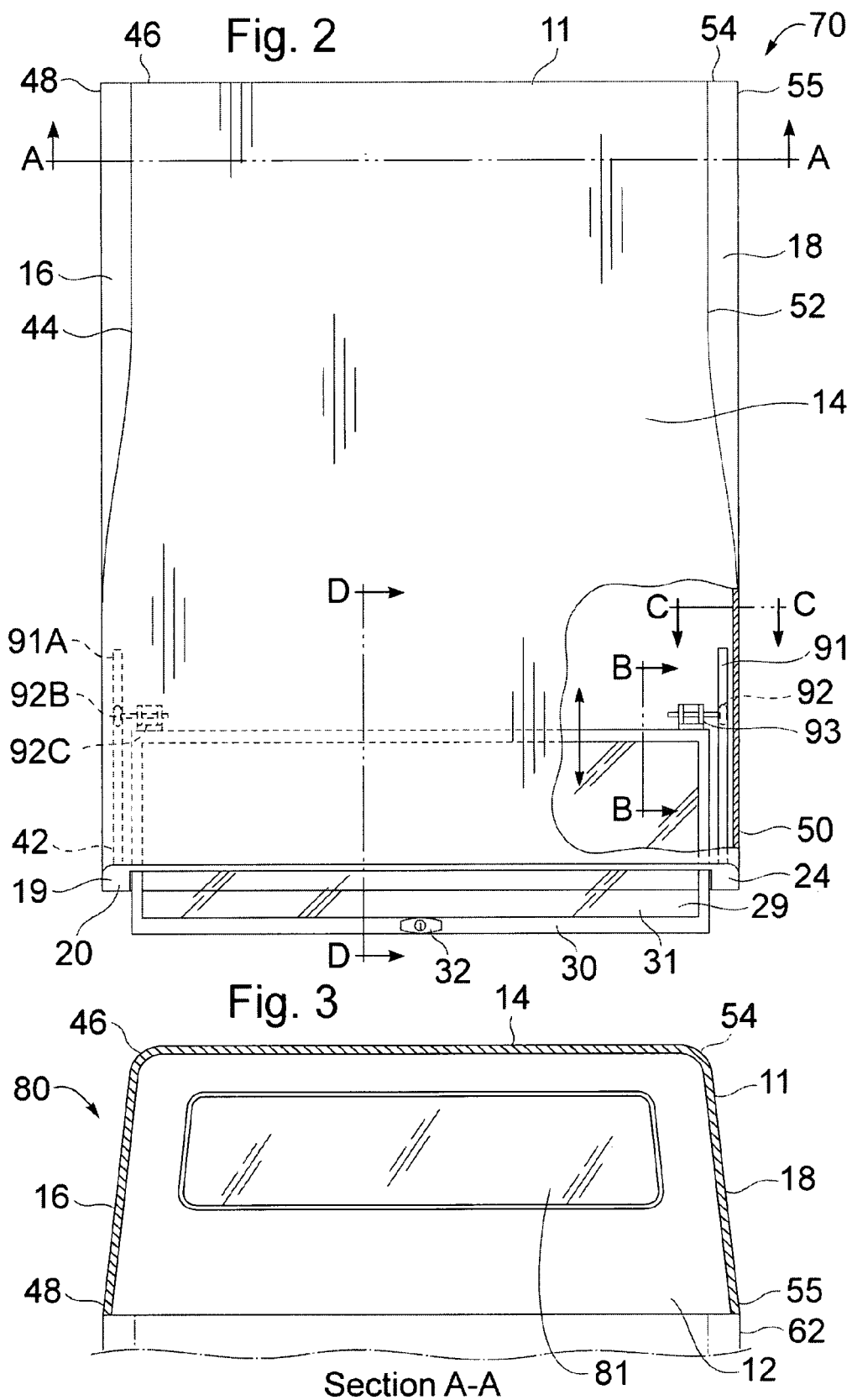

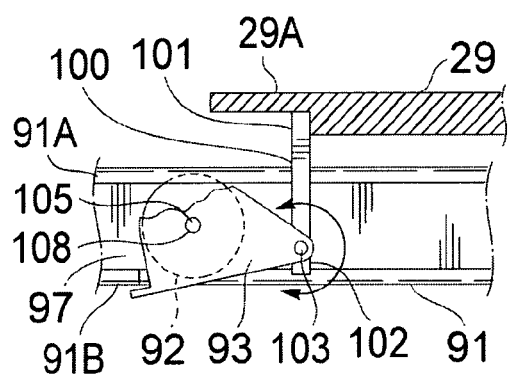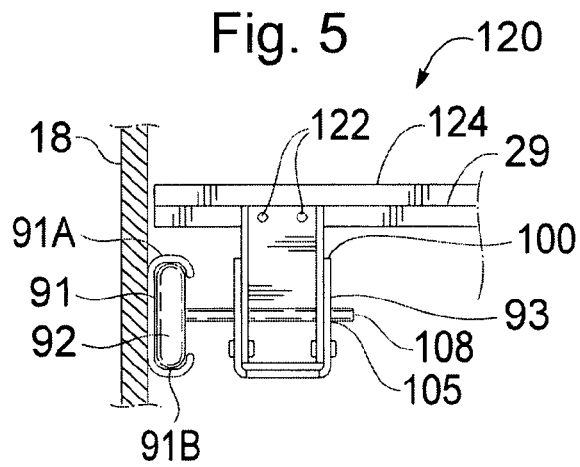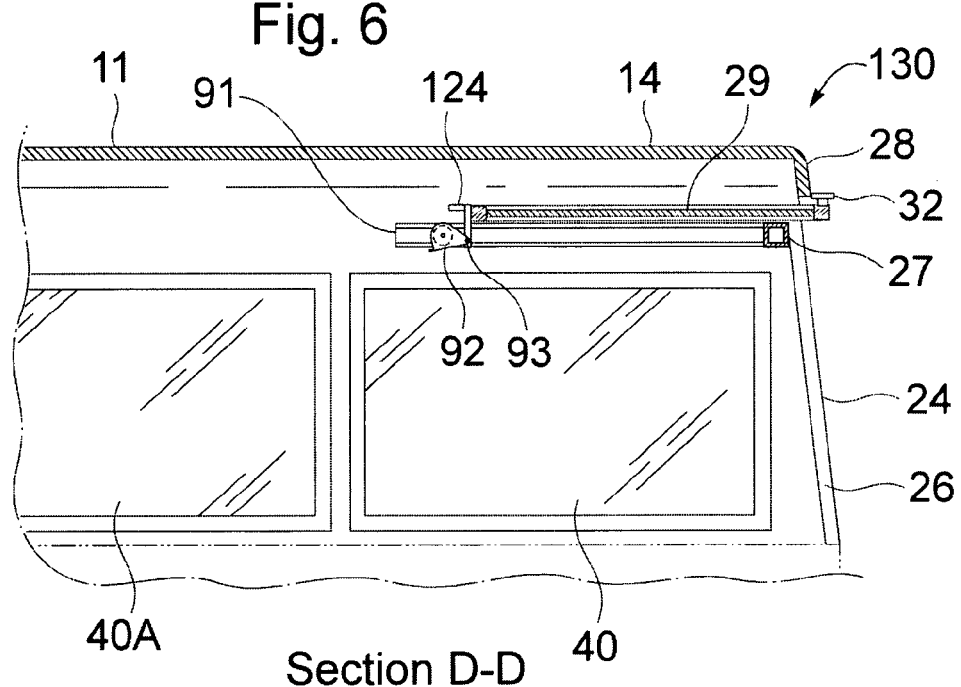

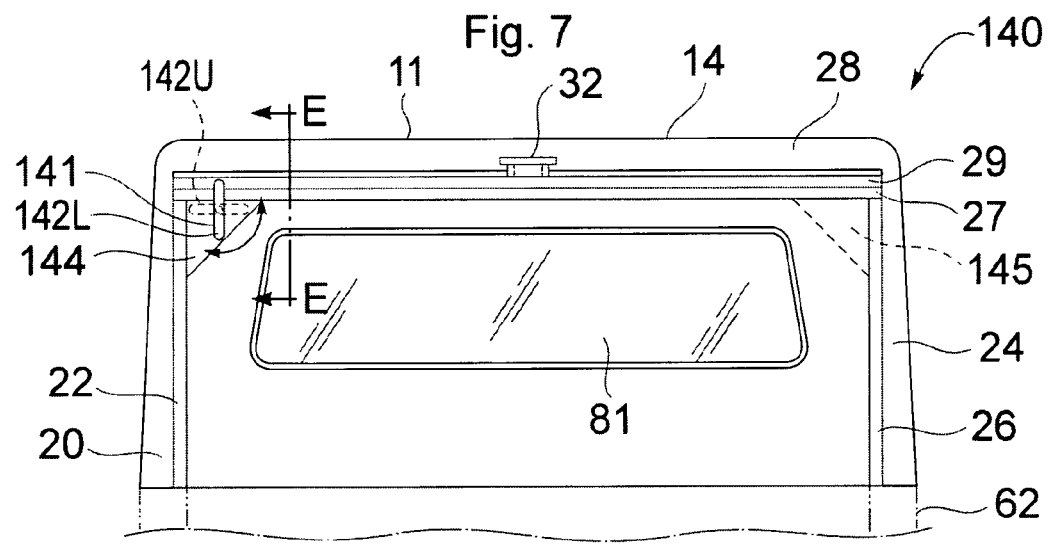
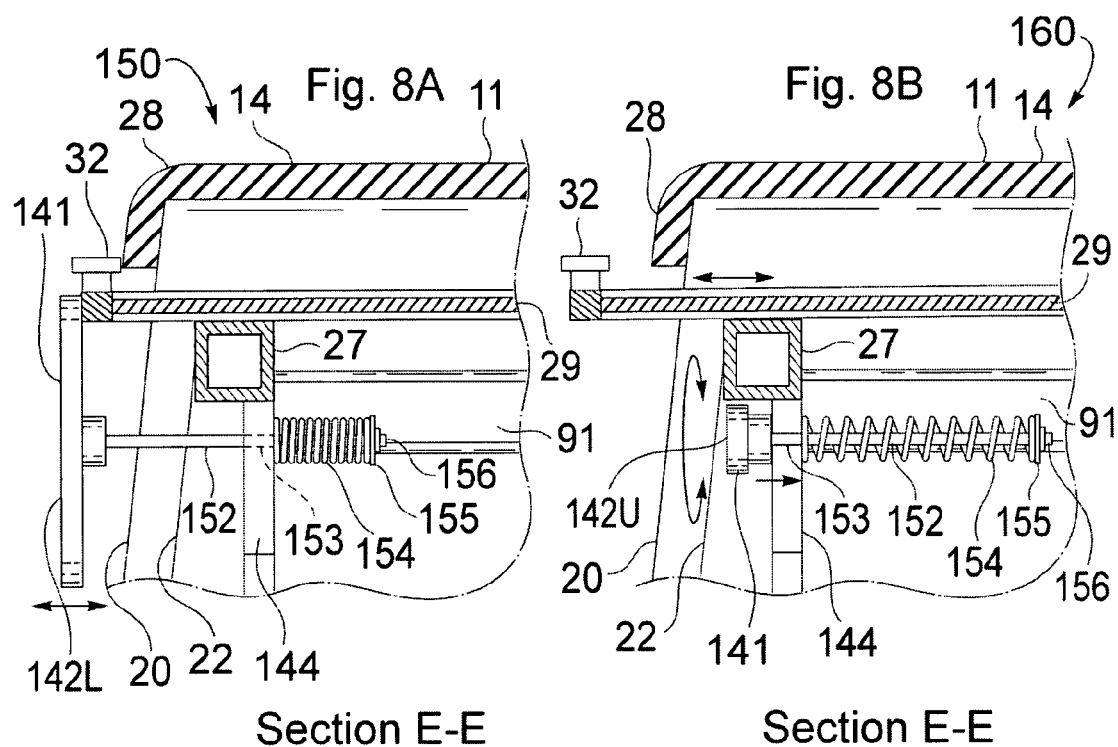

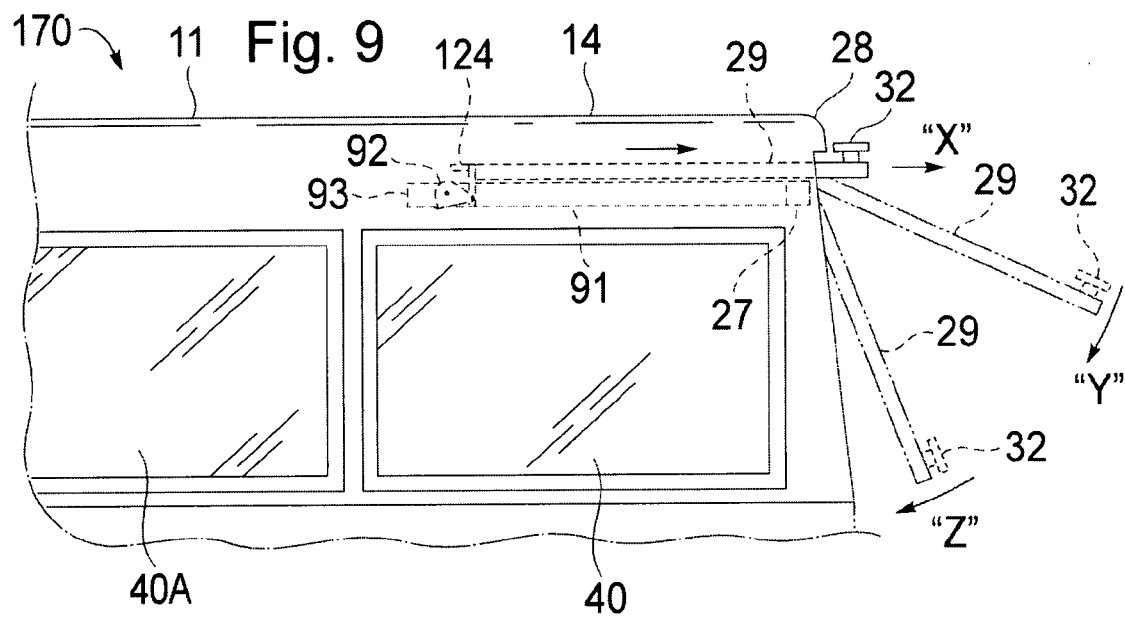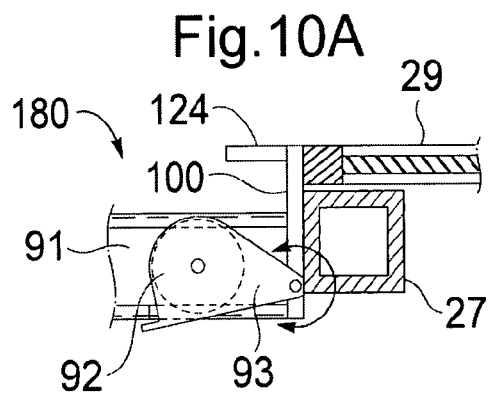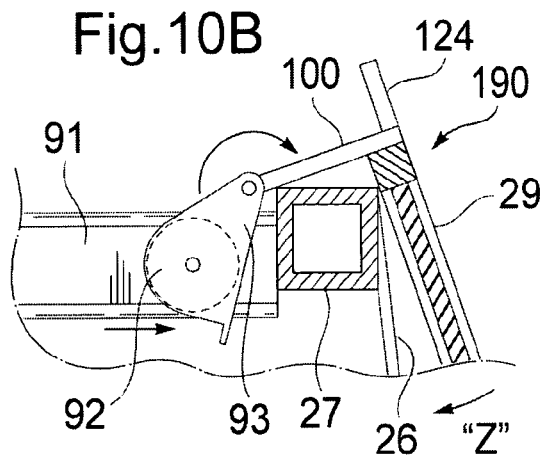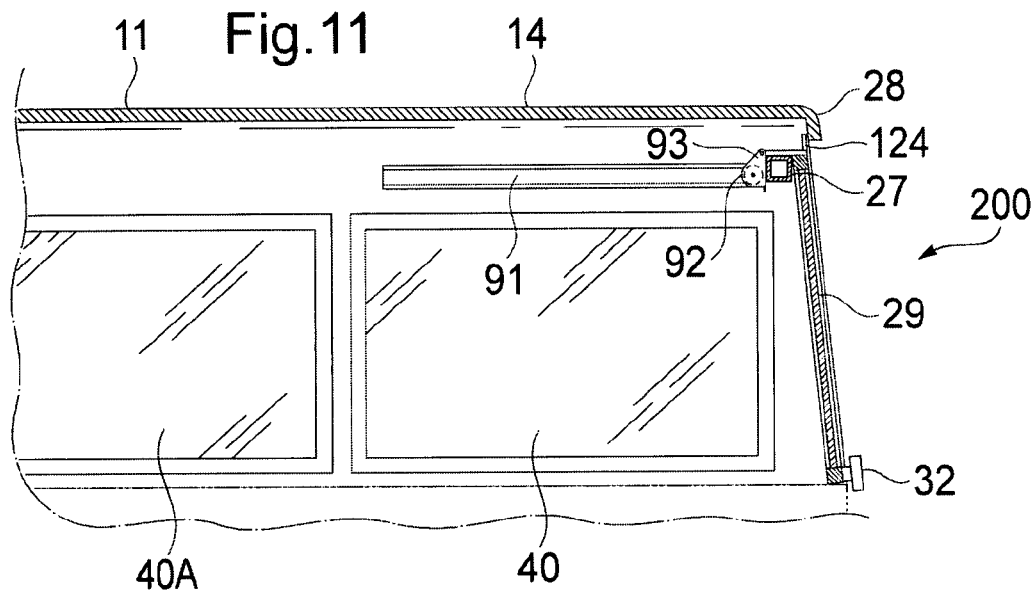

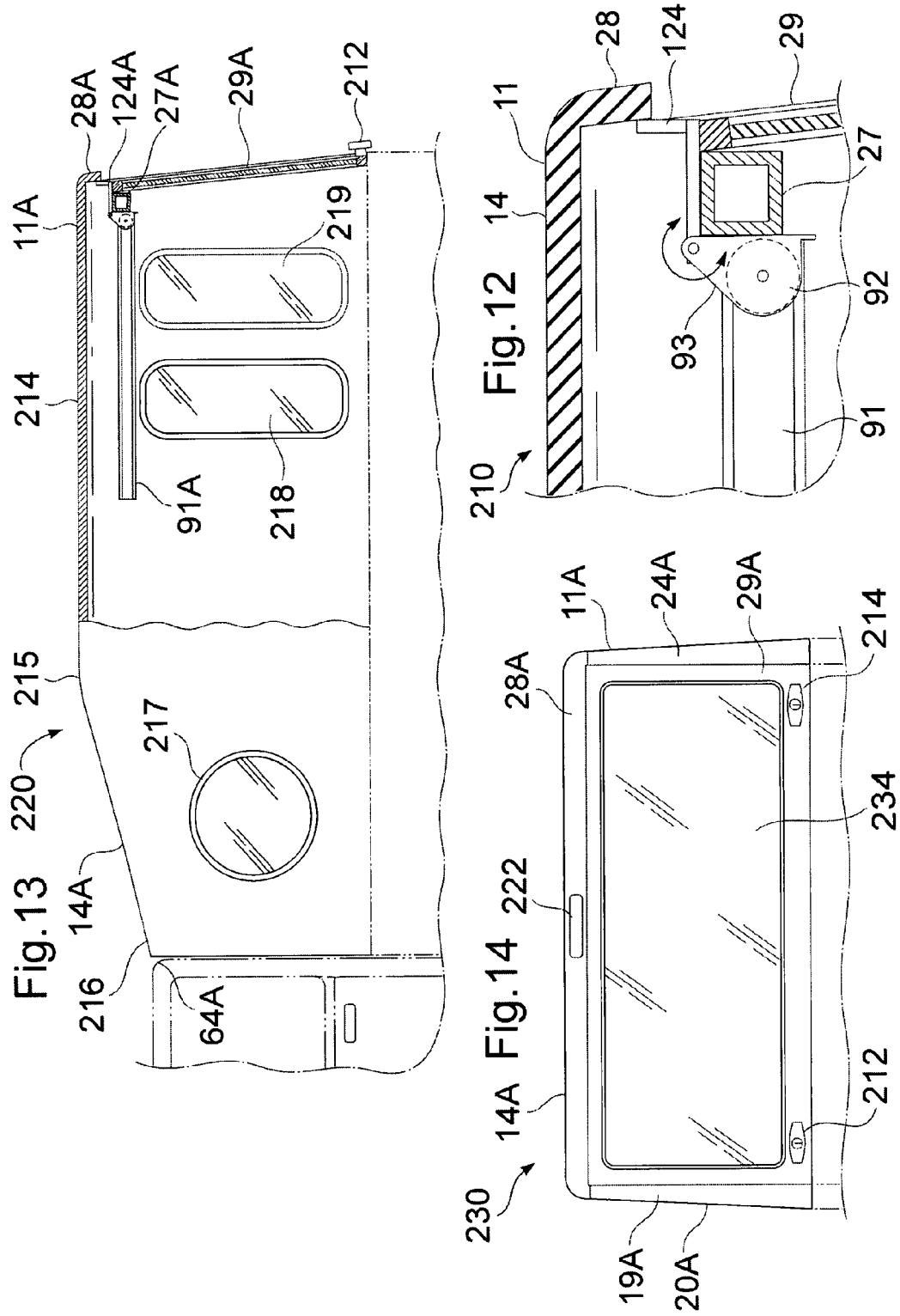

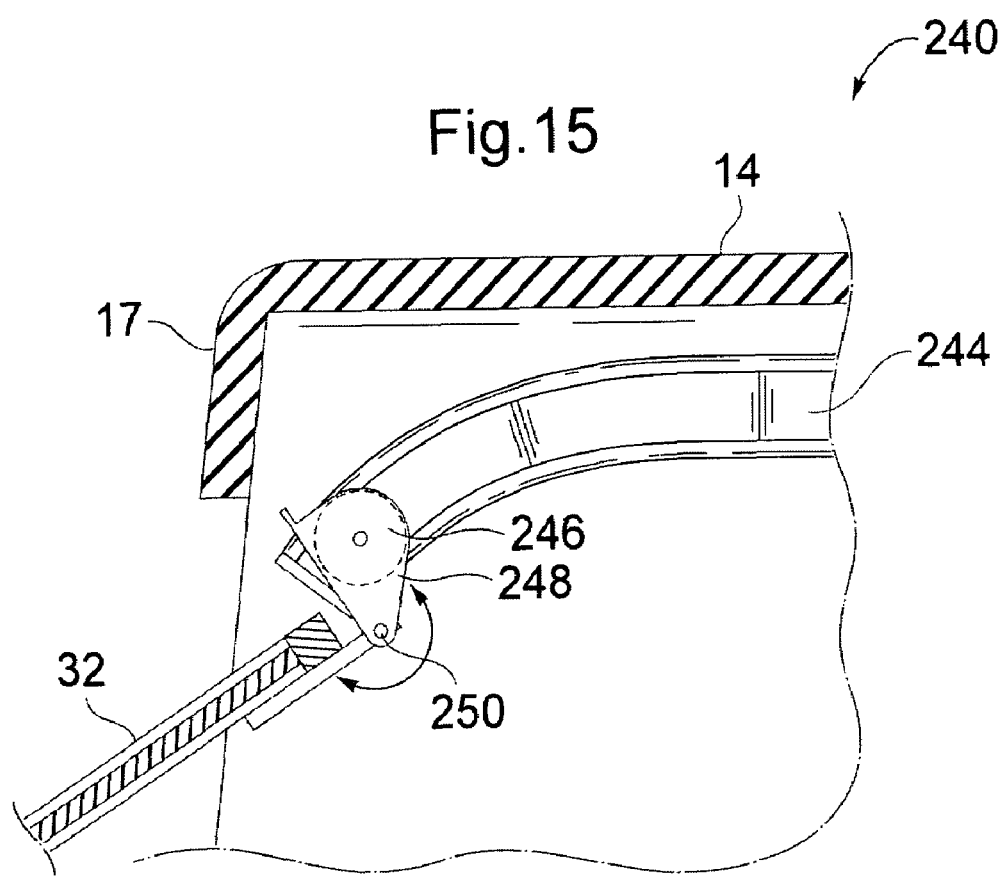
Section F-F

TOPPER WITH RETRACTABLE DOOR FOR PICKUP TRUCKS

CROSS REFERENCE TO RELATED APPLICATIONS

Not Applicable

FEDERALLY SPONSORED RESEARCH

Not Applicable

SEQUENCE LISTING

Not Applicable

FIELD OF THE INVENTION

The invention relates to pick up truck accessories than can be added to pickups to make them more useful. More specifically the invention relates to an improved design for storing the rear door of a pickup truck topper. The improved design is substantially a retractable system for storing the rear door of a pickup truck topper. The side windows can also utilize the new concept for storing the windows in an retracted open position.

DESCRIPTION OF PRIOR ART

Pickup trucks are very popular vehicles for consumers. This type of vehicle is often utilized for personal, recreational, and businesses purposes. Pickups are available from numerous manufacturers and are available in a wide variety of sizes and styles and models. There are small compact pickups, mid-size pickups, and full size pickups including half ton and three quarter ton pickups. Some of these vehicles have a regular size cab and cargo beds. Other versions have "king cabs" with front seats and rear seats. Some pickups have two doors and some have four doors. Some pickups have short cargo beds and some have long extended cargo beds.

An accessory that is often added to pickups is a "truck topper." These devices are sometimes called a "truck cap" or a "truck camper" or a "truck bed cap" or a "pickup truck cap" etc. A truck topper generally provides an enclosed compartment above the pickup cargo bed. Most toppers can be locked to prevent any enclosed tools and personal items from being stolen. Animals and humans can occupy the enclosed space of a pickup topper. Also the topper protects the cargo bed and contents from the rain and snow and bad weather, etc.

Typically toppers have a roof, two side walls, a front wall adjacent the pickup cab and a rear opening with some type of rear door which opens and closes above the pickup tail gate. Typically the top of the rear door is hinged near the roof of the topper.

Toppers are available in a variety of styles and shapes and designs. Consumers can purchase different designs that suit their needs. Typically the front wall of a pickup topper, which is adjacent the pickup cab, matches the contour of the truck cab. The top of the topper has a shorter length and the sides flair outward, generally matching the contour of the truck cab. The bottom edge of the front wall generally matches the dimension of front wall of the pickup bed. The topers can have a streamlined design with the front portion and the rear portion having similar height dimensions. If more cargo space is desired the roof top can arc upward as the roof makes a transition from the front of the topper to the rear of the topper. If the rear of the topper has a large opening, a large door can be incorporated. A large topper door allows bulky items to be loaded and unloaded from the back of the pickup.

Some toppers utilize one piece windows that do not include a metal frame. The hinge mechanism and the struts are fastened through holes in the one piece window.

Toppers can be made of a variety of materials such as aluminum, fiberglass, carbon fiber, wood, steel, plastic, etc.

The side panels of toppers can have a variety of designs. The side panels can have permanent windows that cannot be opened, plastic "bubble" windows, windows that swing outward, windows that swing inward, windows that slide horizontally, etc. Topper side panels can also have doors that swing outward, doors that swing inward, doors that slide horizontally, etc Topper side panels can also be made so that there are no windows or doors.

Toppers can have sun roofs to allow light into the interior of the topper. Some toppers have interior lights and brake lights incorporated thereon.

Some pickup toppers have racks incorporated thereon which can hold long items such as ladders and/or lumber, etc.

The truck topper rear opening typically has a hinged door that moves between an open position and a closed position. Often the rear door has two hinges on the top and it is hinged to the topper roof. Rear doors generally have a metal frame and the door also has a clear window. Often the back window as a trapezoid shape; the top and the bottom of the door are parallel to one another and the top has a shorter length than the bottom of the door. The two side sections of the door connect the shorter top to the longer bottom portion of the door.

Many toppers also have a pair of struts that are connected between the sides of the back door and the sides of the back of the truck. The struts are usually biased with a spring type of mechanism that lifts the back door to an open position and keeps the door in the open position.

Most toppers have some type of locking mechanism. There are one handle designs with linkage that extend to the sides of the back wall for locking. Some toppers have two locking mechanisms; one on left side and one on the right side of the topper door.

Although truck toppers with hinged rear doors are popular there are numerous problems associated with them including the following:

When the topper rear door is left in the open position it can be a serious hazard for someone walking in the area. They could injure their head by walking into an opened door if they are unaware that the door is open.

Also, when the topper rear door is in its open horizontal position, there is often restricted head clearance near the tailgate area of the pickup. Unloading items from the pickup bed and loading items into the pickup bed can be cumbersome if someone can not stand upright during the unloading and/or unloading.

When long items are hauled in the pickup bed, the topper door must be left open and that can be problematic. The door often can flap in the wind, and vibrate and jerk and wear out the hinges and various different components. The struts can be damaged. Also, the window can break. If a rear topper door that has been left in the open position should fall from its open position, the cargo extending out from the pickup bed may be damaged.

Some toppers have racks on the top for hauling long items such as ladders and or long boards, etc. When long items are hauled in the rack on top of a topper, most topper doors cannot be placed in a fully open position because the ladder and/or boards extend beyond the end of the topper. This can be problematic. As it would be hard to place items into the topper and/or take items out of the topper when the rack has items thereon. Also, the window can break if the window would ever hit any items extending rearward beyond the topper rack.

The topper rear door struts tend to wear out and may not hold the door properly in the open position which can be hazardous. Worn struts can be expensive to replace.

When hauling a trailer with a pickup that has a topper can lead to problems. If the topper door is left open it may be damaged by the trailer during turns. Also, if the topper door is open, working in the area of the trailer hitch can be hazardous and cumbersome.

If a topper rear door is left in the open position, it can be damaged during backing of the pickup near any building or a garage or a loading dock.

Some topper designs have a hinged rear door that extends beyond the horizontal position when the door is in the open position. With these designs, the hinged door, when in the open position, can be higher than the height of the back of the topper. When these doors are in the fully open position, shorter people may have a hard time reaching the open door to pull it into the closed position.

OBJECTS OF THE INVENTION

It is an object of the invention to provide a pickup topper with a rear door that can be placed in an open and a closed position and does not have the problems of conventional toppers with a hinged rear door.

It is another object of the invention to provide a pickup topper with a rear door that is stored out of the way when the door is left in the open position and thereby eliminating the possibility of a head injury by someone walking into an opened door.

It is yet another object of the invention to provide a pickup topper with a rear door that is stored out of the way when the door is left in the open position and thereby providing unrestricted head clearance near the tailgate area of the pickup. Unloading items from the pickup bed and loading items into the pickup bed will no longer be cumbersome, and anyone can stand upright during the unloading and/or unloading regardless of how tall they are.

It is yet another object of the invention to provide a pickup topper with a rear door that is stored out of the way when the door is left in the open position and thereby allowing the truck owner to hall long items that may stick out of the truck beyond the bed of the truck.

It is yet another object of the invention to provide a pickup topper that has a rack on the top that will still be allow the user to place rear door into the open position when long items in the topper rack. extend rearward beyond the rear end of the topper such as ladders and/or long boards, etc. The new design would enable a user to easily place items into the topper and/or take items out of the topper when the rack has long items thereon.

It is yet another object of the invention to provide a pickup topper with a rear door that is stored out of the way when the door is left in the open position and the toper does not require rear door struts which wear our and malfunction and can be expensive to replace.

It is yet another object of the invention to provide a pickup topper with a rear door that is stored out of the way when the door is left in the open position thereby eliminating the problems associated with hauling a trailer. With the rear door stored out of the way, turning the pickup with the topper door is open can never cause any damage to the topper door or the trailer. Also, with the topper door stored out of the way, working in the area of the trailer hitch is no longer hazardous and cumbersome.

It is yet another object of the invention to provide a pickup topper with a rear door that is stored out of the way when the door is left in the open position thereby eliminating any damage during backing of the pickup near a building or a garage or a loading dock.

It is yet another object of the invention to provide a pickup topper with a rear door that is stored out of the way when the door is left in the open position which has a very simple design with a minimum of parts.

It is yet another object of the invention to provide a pickup topper with a rear door that is stored out of the way when the door is left in the open position which would be very easy to manufacture.

It is yet another object of the invention to provide a pickup topper with a rear door that is stored out of the way when the door is left in the open position which would be very easy to manufacture with different topper door sizes.

SUMMARY OF THE INVENTION

A pickup truck topper is provided that has a retractable rear door that can be stored in a closed position and an open position. In the open position the topper rear door is stored in a horizontal position just under the roof of the topper. In the closed position the topper rear door is fastened on the rear of the pickup topper above the tailgate of the pickup. The topper has two horizontal tracks mounted on the inside of topper near the roof. The topper rear door has two rollers fasten thereon. The rollers glide in the tracks when the door moves between the closed and the open position. The topper rear door can be locked in closed position and the topper door can be locked in the fully open and retracted position.

BRIEF DESCRIPTION OF THE DRAWINGS

In order that the manner in which the above and other objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying annexed drawings wherein:

FIG. 2 is a top view of one embodiment of the pickup truck topper with retractable doors. The rear door is in an open position and partially retracted into the topper.

FIG. 3 is section view of the pickup truck topper with retractable doors of FIG. 2. The section is through "A-A" of FIG. 2.

FIG. 4 is partial side view of the track and roller and door related hardware of the pickup truck topper with retractable doors of FIG. 2. The section is through "B-B" of FIG. 2. The rear door is in an fully open position and fully retracted into the topper.

FIG. 5 is partial view the track and roller and door related hardware of the pickup truck topper with retractable doors of FIG. The section is through "C-C" of FIG. 2. The rear door is in an fully open position and fully retracted into the topper.

FIG. 6 is partial view the track and roller and door related hardware of the pickup truck topper with retractable doors of FIG. The section is through "D-D" of FIG. 2. The rear door is in an fully open position and fully retracted into the topper.

FIG. 7 is a rear view of the pickup truck topper with retractable doors of FIG. 2. The rear door is in the fully open position and fully retracted into the topper. A lock retains the retractable door in the fully retracted position.

FIG. 8A is section side view of the pickup truck topper locking device with retractable door of FIG. 7. The section is through "E-E" of FIG. 7. The locking device is in the locked position.

FIG. 8B is section side view of the pickup truck topper locking device with retractable door of FIG. 7. The section is through "E-E" of FIG. 7. The locking device is in the unlocked position.

FIG. 9 is side view of the pickup truck topper with retractable doors of FIG. 2. The rear door is in an open position retracted into the topper. Additional drawings show how the retractable door would be moved toward the closed position above the truck tailgate.

FIG. 10A is partial view the track and roller and door related hardware of the pickup truck topper with retractable doors of FIG. The similar to the section through "B-B" of FIG. 2. The rear door is fully extended toward the rear of the topper.

FIG. 10B is partial view the track and roller and door related hardware of the pickup truck topper with retractable doors of FIG. The section is similar to the section "B-B" of FIG. 2. The rear door is fully extended toward the rear of the topper and the door has been rotated toward the closed position.

FIG. 11 is partial view the track and roller and door related hardware of the pickup truck topper with retractable doors of FIG. The section is through "D-D" of FIG. 2. The rear door is in an fully closed position.

FIG. 12 is an enlarged partial view of the track and roller and door related hardware of the pickup truck topper with retractable doors shown in FIG. 11. The rear door is in a fully closed position.

FIG. 13 is side view of an alternate design for a the pickup truck topper with retractable door. This design has a large rear door. A partial section view shows the track and roller and door related hardware The rear door is in an fully closed position.

FIG. 14 is rear view of the alternate design for a the pickup truck topper with retractable door shown in FIG. 13. This design has a large rear door. The rear door is in a fully closed position.

FIG. 15 is side view of the side retractable door for the pickup truck topper with retractable door shown in FIG. 2. The side retractable door is in an open position. The section is through "F-F" of FIG. 2.

Figure 1:
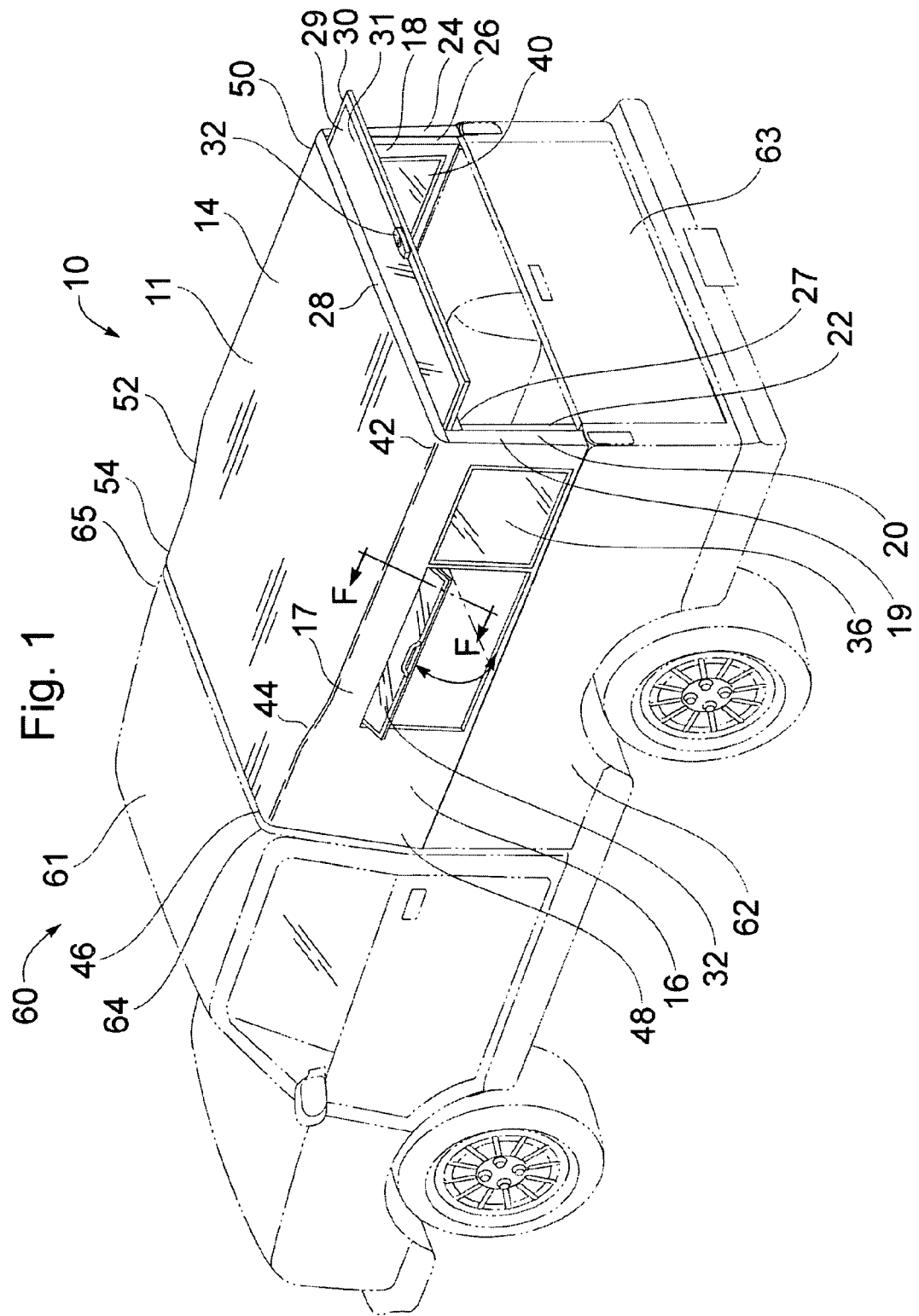
FIG. 1 perspective view of one embodiment of the pickup truck topper with retractable doors. The rear door is in an open position and partially retracted into the topper. Two side doors are also in an open position and partially retracted into the topper.

The objects and advantages of the invention will become apparent when the drawings are studied in conjunction with reading the following description and also reading the claims.

DESCRIPTION OF THE PREFERRED EMBODIMENTS

In keeping with the requirements of patent Laws there is described herein below the best mode of the invention that is currently known to the applicant. For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference now to the drawings, and in particular, to FIGS. 1-15 thereof, the preferred embodiments of the new and improved pickup truck topper with retractable door embodying the principles and concepts of the present invention and generally designated by the reference number 10 will be described.

FIG. 1 shown generally at 10 a pickup truck topper 11 with retractable doors. Shown generally at 60 is the pickup with a pickup cab 61, a pickup bed 62 and pickup tailgate 63. The pickup truck topper has a front wall 12 (not shown), a top wall 14, a left side wall 16, and left side panel, and a right side wall 18. Topper has a rear wall 19 with a left rear wall 20, with a left door stop 22, and a right rear wall 24, with a right door stop 26 and a top rear wall lip 28. Topper 11 has a horizontal door support member 27. The topper 11 has a rear retractable door 29 that has a door frame 30, a window, and a locking device 32. Topper has a left side retractable window 34 and a left side window 36 and a right side retractable window (not shown) and a right side window 40. Topper side wall 16 has a wall sevtion 17 above side retractable door 32.

The rear retractable door 29 is in an open position and partially retracted into the topper. The left side retractable window 32 is in an open position and partially retracted into the topper 11. The topper 11 when viewed from the rear has substantially a rectangular rear shape. As the topper top left edge makes a transition from the rear left corner 42 toward the pickup cab 61 the left top edge of the toper has a left top contour 44, and terminates at a left top front corner 46 where the topper 11 meets the left top rear corner 64 of the pickup cab 61. Topper left side wall 16 angles outward as side wall 16 makes a transition from top left corner 46 to bottom left corner 48.

As the top right edge makes a transition from the right rear corner 50 toward the pickup cab 61 the right top edge of the toper has a right top contour 52, and a right top front corner 54 where the topper 11 meets the right top rear corner 65 of the pickup cab 11. Topper right side wall 18 angles outward as side wall makes a transition from top right corner 54 to bottom right corner 55 (not seen).

The front wall of the topper substantially matches the rear wall of the pickup cab. This gives the topper 11 an aerodynamic design relative to the pickup cab 61. The rear retractable door 29 has a locking mechanism 32 which is utilized to lock the retractable rear door in a closed position above the tailgate 63. A variety of designs could be utilized for the locking mechanism 32.

Shown generally at 70 in FIG. 2 is a top view of one embodiment of the pickup truck topper 11 with a retractable door 29. The pickup truck topper 11 has a front wall (not shown), a top wall 14, a left side wall 16, and a right side wall 18. Topper 11 has a rear wall with a left rear wall 20, with a left door stop 22 (not shown), and a right rear wall 24, with a right door stop 26 (not shown) and a top rear wall lip 28. The topper has a rear retractable door 29 that has a door frame 30, a window 31, and a locking device 32. The rear door 29 is in an open position and partially retracted into the topper 11.

The topper 11 when viewed from the rear has substantially a rectangular rear shape. As the top left edge makes a transition from the rear left corner 42 toward the pickup cab 61 the left top edge of the toper has a left top contour 44, and terminates at a left top front corner 46 where the topper 11 meets the left top rear corner 64 (not shown) of the pickup cab 611 (not shown). Topper left side wall 16 angles outward as side wall 16 makes a transition from top left corner 46 to bottom left corner 48. As topper top right edge makes a transition from the rear right corner 50 toward the pickup cab 61 the right top edge of the topper has a right top contour 52, and terminates at a right top front corner 54 where the topper 11 meets the top right rear corner 65 (not shown) of the pickup cab 11. Topper right side wall 18 angles outward as side wall 18 makes a transition from top right corner 54 to bottom right corner 55.

Shown generally at 80 in FIG. 3 is section view of the pickup truck topper 11 with retractable doors of FIG. 2. The section is through "A-A" of FIG. 2. The view shows the topper top wall 14 and a topper left side wall 16, a topper right side wall 18, and the topper front wall 12. The shape of topper 11 front wall generally matches the contour of the back wall of the pickup cab 61 (not shown). The left side wall 16 has a top left corner 46 and a bottom left corner 48. Left side wall 16 generally angles outward as left side wall 16 makes a transition from top left corner 46 to bottom left corner 48. The right side wall 18 has a top right corner 54 and a bottom right corner 55. Right side wall 18 generally angles outward as right side wall 18 makes a transition from top right corner 54 to bottom right corner The topper front wall 12 has window 81.

Shown generally at 90 in FIG. 4 is partial side view of the right track 91 and right roller 92 and right roller hardware 93 of the pickup truck topper 11 with retractable rear door 29 of FIG. 2. The section is through "B-B" of FIG. 2. The retractable rear door 29 is in a fully open position and fully retracted into the topper 11. Track 91 has a track top 91A and a track bottom 91B. Track 91 may have a fastening device (not shown) such a rivet or bolt or other mounting devices that hold the track to the topper 11. The mounting hardware has a rigid member 100 that has a first end 101 that is securely fastened to the door 29 by welding or other fastening method. Rigid member 100 has a second end 102 that forms a pivot 103 with the wheel holding hardware member 93. Wheel holding hardware member 93 has openings 105 that hold wheel shaft 108 which is connected to wheel 92. Retractable door 29 has sealing lip 29A on the top of door 29.

Shown generally at 120 in FIG. 5 is partial view the right track 91 and roller 92 and roller related hardware 93 of the pickup truck topper 11 with retractable door 29 of FIG. 2. The section is through "C-C" of FIG. The rear door 29 is in an fully open position and fully retracted into the topper 11. Track 91 has a track top 91A and a track bottom 91B and is fastened to the right side wall 18 of the topper 11. The mounting hardware has a rigid member 100 that has a first end 101 that is fastened to the door 29 by rivets 122. Rigid member 100 has a second end 102 that forms a pivot with the wheel holding hardware member Wheel holding hardware member 93 has openings 105 that hold wheel shaft 108 which is connected to wheel 92. Retractable door 29 has resilient sealing lip 124 the top of door 29.

Shown generally at 130 in FIG. 6 is partial view the right track 91 and right roller and right roller related hardware 93 of the pickup truck topper 11 with retractable door 29 of FIG. 2. The section is through "D-D" of FIG. 2. The rear door 29 is in an fully open position and fully retracted into the topper 11 The topper 11 has side windows 40 and 40A. Horizontal door support holds door 29 in open position.

Shown generally at 140 in FIG. 7 is a rear view of the pickup truck topper 11 with retractable door 29 of FIG. 2 shown mounted on the pickup bed 62. The retractable rear door 29 is in the fully open position and fully retracted into the topper 11. Horizontal door support member 27 extends across the rear of the topper 11 and holds the retractable door 29 in the retracted position. The topper rear top wall and left rear wall 20 and right rear wall 24 are shown. A left rear wall 20 has a left door stop 22 and a right rear wall 24 has a right door stop 26. The retractable door 29 fits adjacent the left door stop 22 and the right door stop 26 when the retractable door 29 is in the fully closed position. The right door stop can have a flexible sealing strip (not shown) and the left door stop 22 can have a flexible sealing strip (not shown). The sealing strips help seal the retractable door 29 when the door is in the fully closed position. Lock device 141 has a lock handle 142 that retains the retractable door 29 locked in the fully retracted position (142 "L"). Lock handle 142 rotates to an alternate position when the retractable door 29 is in an unlocked position (142 "U").

Shown generally at 150 in FIG. 8A is a cross section view of the lock device 141 shown in FIG. 7 of the pickup truck topper 11 with retractable door 29. The view is through section "E-E" of FIG. 7. Lock device 141 has a lock handle 142 that retains the retractable door 29 locked in the fully retracted position (142 "L"). Shown also is topper 11 top wall 14 and rear top wall lip 28. Also shown is horizontal door support member 27 left rear wall 20 and left door stop 22. Triangle lock support 144 that has shaft hole 153. Lock device 141 has handle 142, shaft 152, spring 154 washer 155 and retaining nut 156. Shaft 152 extends through hole 153 in triangle lock support 144. Lock spring 154 is compressed and lock handle 142 retains door 29 in a fully retracted and locked position.

Shown generally at 160 in FIG. 8B is a cross section view the lock device 141 shown in FIG. 7 of the pickup truck topper 11 with retractable door 29. The view is through section "E-E" of FIG. 7. Lock device 141 has a lock handle 142 that can retain the retractable door 29 in a locked position. Lock device 141 has lock handle 142 rotated to an unlocked position (142 "U"). Shown also is topper 11 top wall 14 and rear wall top lip 28. Also shown is horizontal door support member 27, and left rear wall 20 and left door stop 22. Triangle lock support 142 has shaft hole 153. Lock device 141 has handle 142, shaft 152, spring 154 washer 155 and retaining nut 156. Shaft 152 extends through hole 153 in triangle support 144. Lock spring 154 is uncompressed and lock handle 142 is rotated to an unlocked position. (142 "U"). Various other locking devices could be utilized to retain retractable door 29 in a locked position. Additionally, various locking devices could be utilized to retain retractable door 29 in a locked closed position.

An alternate design for topper 11 and retractable door 29 would have the door 29 fully enclosed within topper 11 when the door is in a retracted and locked position.

Shown generally at 170 in FIG. 9 is partial view of the right track 91 and right roller 92 and right roller related hardware 93 of the pickup truck topper 11 with retractable door 29 of FIG. 2. The section is through "D-D" of FIG. 2. The rear door 29 is in an open position and retracted into the topper 11 The topper 11 has side windows 40 and 40A. Horizontal door support member 27 holds door 29 in open position. Door 29 has sealing lip 124. FIG. 9 shows how a door 29 would move from a retracted horizontal position (position "x") and moving toward closed position. Position "y" and position "z" show the retractable door 29 rotating toward a closed position. (The closed position for the retractable door 29 is shown in FIG. 11)

Shown generally at 180 in FIG. 10A is partial side view of the right track 91 and right roller 92 and right roller hardware 93 of the pickup truck topper with retractable rear door of FIG. 2. The section is through "B-B" of FIG. 2. The retractable rear door 29 is positioned fully rearward toward the rear of the topper 11. Rigid member 100 is adjacent horizontal door support member 27 and door 29 is resting on top of horizontal door support member 27. Track 91 holds roller 92.

Door 29 has sealing lip 124. The mounting hardware has a rigid member 100 has end 101 that is securely fastened to the door 29 by welding or other fastening method. Rigid member 100 has a second end 102 that forms a pivot 103 with the wheel holding hardware member 93. Wheel holding hardware member 93 has openings 105 that hold wheel shaft 108 which is connected to wheel 92.

Shown generally at 190 in FIG. 10B is partial side view of the right track 91 and right roller 92 and right roller hardware 93 of the pickup truck topper with retractable rear door of FIG. 2. The section is generally through "B-B" of FIG. 2. The retractable rear door 29 is in positioned fully rearward out of the topper 11 and door 29 is rotated toward the closed position similar to position "Z" in FIG. 9. Rigid member 100 is rotating on top of horizontal door support member 27. Track 91 holds roller 92. Door 29 has sealing lip 124. The mounting hardware has a rigid member 100 has end 101 that is securely fastened to the door 29 by welding or other fastening method. Rigid member 100 has a second end 102 that forms a pivot 103 with the wheel holding hardware member 93. Wheel holding hardware member 93 has openings 105 that hold wheel shaft 108 which is connected to wheel 92.

Shown generally at 200 in FIG. 11 is partial view the right track 91 and right roller 92 and right roller related hardware 93 of the pickup truck topper 11 with retractable door 29 of FIG. 2. The rear door 29 is in an fully closed position. Door 29 has lock 32. Shown is topper top wall 14 and topper rear wall top lip and door sealing lip 124. The topper 11 has side windows 40 and 40A.

Shown generally at 210 in FIG. 12 is a close up partial side view the right track 91 and right roller 92 and right roller related hardware 93, and horizontal door support member of the pickup truck topper 11 with retractable door 29 of FIG. 11. The rear door is in an fully closed position. Shown is topper 11 top wall 14 and topper rear wall top lip 28 and door sealing lip 124.

Shown generally at 220 in FIG. 13 is an alternate embodiment for a topper 11A with a large retractable door 29A. This design gives the topper extra cargo space and enables large items to be hauled by the truck. Shown is the right track 91A and right roller 92A and right roller related hardware 93A of the pickup truck topper 11A with retractable door 29A. The large rear door 29A is in a fully closed position. Door 29A has lock 212 and lock 214 (not seen). Shown is topper top wall 214 and topper rear lip 28A and door sealing lip 124A. Pickup cap has rear corner 64A. Topper 11A has front top edge 215 that matches pickup cab corner 64A. Topper top wall 14A generally angles upward as wall extends rearward to point 215 where topper top wall 14A generally is horizontal until it reaches the rear of the topper. The topper 11A has side windows 217, 218, and 219. Shown generally at 230 in FIG. 14 is rear view of the alternate design for a the pickup truck topper 11A with retractable door 29A shown in FIG. 13. The retractable rear door 29A is in an fully closed position. The topper rear top wall 28A and left rear wall 20A and right rear wall 24A are shown. The retractable door 29A fits adjacent the left door wall 20A and the right door wall 24A when the retractable door 29A is in the fully closed position. Retractable door 29A has left side lock 212 and a right side lock 214 which retain the retractable door 29A in the fully closed and locked position. Stop light 232 is located on top rear wall area 28A of topper 11A. Rear door has large window 234.

Shown generally at 240 in FIG. 15 is section view of the side retractable door shown in FIG. 1. The section is through "F-F" of FIG. 1. The design is for a side retractable door 32 shown in FIG. 1. Retractable rear door 32 is in a partially open position. Also shown is topper top wall 14, side wall section 16A, curved track 244, roller 246, roller mounting hardware 248, and roller hardware pivot 250. Track 244 is curved up under the topper top wall 14 so that side door 32 can be stored near topper top wall 14, thereby being out of the way when the pickup bed is utilized to haul bulky items even when side window 32 is in an open position.

A variety of topper designs with retractable doors could be manufactured to accommodate the various designs of pickups that are manufactured. The different designs could be for small compact pickups, mid-size pickups, and full size pickups including half ton and three quarter ton pickups. Other topper designs with retractable doors could be made for vehicles that have regular size cabs and cargo beds, as well as pickups with "king cabs" with front and rear seats, and/or two doors and/or four doors, short cargo beds, long extended cargo beds, etc.

Toppers with retractable doors can be made of a variety of materials such as aluminum, fiberglass, carbon fiber, wood, steel, plastic, etc.

It should be very clear from the drawings and the above description that this new pickup truck topper with retractable door is unique and clearly provides a solution that the prior art does not provide.

It should be clear that the new pickup truck topper with retractable door does provide a pickup topper with a rear door that can be placed in an open and a closed position and does not have the problems of conventional toppers with a hinged rear door.

It should be clear that the new pickup truck topper with retractable door does provide a pickup topper with a rear door that is stored out of the way when the door is left in the open position and thereby eliminating the possibility of a head injury by someone walking into an opened door.

It should be clear that the new pickup truck topper with retractable door does provide a pickup topper with a rear door that is stored out of the way when the door is left in the open position and thereby providing unrestricted head clearance near the tailgate area of the pickup. Unloading items from the pickup bed and loading items into the pickup bed will no longer be cumbersome, and anyone can stand upright during the unloading and/or loading regardless of how tall they are.

It should be clear that the new pickup truck topper with retractable door does provide a pickup topper with a rear door that is stored out of the way when the door is left in the open position and thereby allowing the truck owner to hall long items that may stick out of the truck beyond the bed of the truck.

It should be clear that the new pickup truck topper with retractable door does provide a pickup topper with a rear door that is stored out of the way when the door is left in the open position and the toper does not require rear door struts which wear our and malfunction and can be expensive to replace.

It should be clear that the new pickup truck topper with retractable door does provide a pickup topper with a rear door that is stored out of the way when the door is left in the open position thereby eliminating the problems associated with hauling a trailer. With the rear door stored out of the way, turning the pickup with the topper door is open can never cause any damage to the topper door or the trailer. Also, with the topper door stored out of the way, working in the area of the trailer hitch is no longer hazardous and cumbersome.

It should be clear that the new pickup truck topper does provide a pickup topper with a rear door that is stored out of the way when the door is left in the open position thereby eliminating any damage during backing of the pickup near a building or a garage or a loading dock.

It should be clear that the new pickup truck topper with retractable door does provide a pickup topper with a rear door that is stored out of the way when the door is left in the open position which has a very simple design with a minimum of parts.

It should be clear that the new pickup truck topper with retractable door does provide a pickup topper with a rear door that is stored out of the way when the door is left in the open position which would be very easy to manufacture.

It should be clear that the new pickup truck topper with retractable door does provide a pickup topper with a rear door that is stored out of the way when the door is left in the open position which would be very easy to manufacture with different topper door sizes.

This invention having been described in its presently contemplated best mode, it is clear that it is susceptible to numerous, variations, modifications, modes and embodiments within the ability of those skilled in the art and without departing from the true spirit and scope of the novel concepts or principles of this invention. Also, it is to be understood that the phraseology and terminology employed herein are for the purpose of description and should not be regarded as limiting. It should be understood that the preferred embodiments have been shown and described and that all changes and modifications that come within the spirit of the invention are desired to be protected. The invention is capable of other embodiments and of being practiced and carried out in various ways. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Accordingly, the scope of the invention is defined by the scope of the following claims.

What is claimed as new and desired to be secured by United States Letters Patent is:

1. A topper with a retractable door for attaching to the bed of a pickup truck comprising:
    a topper enclosure that can be fastened over the bed of a pickup truck;
    said topper enclosure having a topper top wall, a topper front wall, a topper first side wall, a topper second side wall, and a topper rear opening; said topper rear opening having a predetermined height and width;
    a retractable door that has a predetermined height and width; said retractable door having a door top, a door bottom, a door first side, a door second side, a door inner surface, and a door outer surface; said retractable door being sized to mate with said topper rear opening;
    a first horizontal track means that is fastened to said topper enclosure; and a
    second horizontal track means that is fastened to said topper enclosure;
    a first roller mounting assembly and a second roller mounting assembly;
    said first roller mounting assembly having a rigid member and a roller holding section;
    said rigid member having a first end and a second end; said first end of said rigid member being securely fastened to said retractable door near said door top; said second end of said rigid member having a pivoting means thereon; said roller holding section having a first end and a second end; said first end of said roller holding section having a pivoting means thereon; said pivoting means on said roller holding section being connected to said pivoting means on said rigid member; said second end of said roller holding section having a shaft mounted thereon; said shaft having a roller mounted thereon;
    said roller on said first roller mounting assembly engages said first horizontal track means;
    said second roller mounting assembly having a rigid member and a roller holding section; said rigid member having a first end and a second end; said first end of said rigid member being securely fastened to said retractable door near said door top; said second end of said rigid member having a pivoting means thereon; said roller holding section having a first end and a second end; said first end of said roller holding section having a pivoting means thereon; said pivoting means on said roller holding section being connected to said pivoting means on said rigid member; said second end of said roller holding section having a shaft mounted thereon; said shaft having a roller mounted thereon;
    said roller on said second roller mounting assembly engages said second horizontal track means;
    a horizontal door support member that extends in substantially a horizontal orientation across said topper rear opening, between said topper first side wall and said topper second side wall; said horizontal door support member being fastened to said topper enclosure near said topper top wall; said horizontal door support member being fastened to said topper enclosure near said topper rear opening;
    said retractable door being movable between a closed position and an open position;
    in said closed position, said retractable door covers said topper rear opening;
    when said retractable door is in said closed position, said rigid member on said first roller mounting assembly is positioned on the top of said horizontal support member;
    when said retractable door is in said closed position, said rigid member on said second roller mounting assembly is positioned on the top of said horizontal support member;
    when said retractable door in said open position said retractable door is stored in substantially a horizontal position under said topper top wall;
    when said retractable door is in said open position said retractable door top is supported by said roller on said first roller mounting assembly and said first horizontal track means;
    when said retractable door is in said open position said retractable door top is supported by said roller on said second roller mounting assembly and said second horizontal track means;
    when said retractable door is in said open position said inner surface of said retractable door contacts said horizontal door support member;
    when said retractable door is in said open position said horizontal door support member supports said retractable door in substantially a horizontal position under said topper top wall.

2. The topper of claim 1 wherein said roller holding section on said first roller mounting assembly contacts said horizontal door support member when said retractable door is in said closed position; and wherein said roller holding section on said second roller mounting assembly contacts said horizontal door support member when said retractable door is in said closed position.

3. The topper of claim 1 wherein said roller holding section on said first roller mounting assembly is in substantially a horizontal orientation when said retractable door is in said open position; and wherein said roller holding section on said second roller mounting assembly is in substantially a horizontal orientation when said retractable door is in said open position.

4. The topper of claim 1 wherein said rigid member on said first roller mounting assembly is in substantially a vertical orientation when said retractable door is in said open position; and wherein said rigid member on said second roller mounting assembly is in substantially a vertical orientation when said retractable door is in said open position.

5. The topper of claim 1 further including a lock device that locks said retractable door in said closed position.

6. The topper of claim 1 further including a retaining device that retains said retractable door in said open position.

7. The topper of claim 1 wherein said retractable door has substantially a rectangular shape.

8. The topper of claim 1 wherein said topper rear opening has substantially a rectangular shape.

9. The topper of claim 1 wherein said door top of said retractable door has sealing lip.

10. The topper of claim 1 including means for fastening said first horizontal track to said topper enclosure and means for fastening said second horizontal track to said toper enclosure.

11. The topper of claim 1 including means for fastening said horizontal door support member to said topper enclosure.

12. The topper of claim 1 including means for sealing the edges of said retractable door when said retractable door is in said closed position.

13. The topper of claim 1 including a brake light.

14. The topper of claim 1 wherein said first side wall has a window thereon, or, said second side wall has a window thereon; or any combination thereof.

15. The topper of claim 1 wherein said first side wall has a retractable window thereon or said second side wall has a retractable window thereon; or any combination thereof.

16. The topper of claim 1 wherein said topper rear opening has a height that is taller than the height of said toper front wall.

17. The topper of claim 1 wherein said topper is made of aluminum, or fiberglass, or carbon fiber, or wood, or steel, or plastic, or any combination thereof.

18. A topper with a retractable door for attaching to the bed of a pickup truck comprising:
- a topper enclosure that can be fastened over the bed of a pickup truck;
- said topper enclosure having a topper top wall, a topper front wall, a topper first side wall, a topper second side wall, and a topper rear opening; said topper rear opening having a predetermined height and width;
- a retractable door that has a predetermined height and width; said retractable door having a door top, a door bottom, a door first side, a door second side, a door inner surface, and a door outer surface; said retractable door being sized to mate with said topper rear opening;
- a first horizontal track means that is fastened to said topper enclosure; and a
- second horizontal track means that is fastened to said topper enclosure;
- a first roller mounting assembly and a second roller mounting assembly;
- said first roller mounting assembly having a rigid member and a roller holding section; said rigid member having a first end and a second end; said first end of said rigid member being securely fastened to said retractable door near said door top; said second end of said rigid member having a pivoting means thereon; said roller holding section having a first end and a second end; said first end of said roller holding section having a pivoting means thereon; said pivoting means on said roller holding section being connected to said pivoting means on said rigid member; said second end of said roller holding section having a shaft mounted thereon; said shaft having a roller mounted thereon;
- said roller on said first roller mounting assembly engages said first horizontal track means;
- said second roller mounting assembly having a rigid member and a roller holding section; said rigid member having a first end and a second end; said first end of said rigid member being securely fastened to said retractable door near said door top; said second end of said rigid member having a pivoting means thereon; said roller holding section having a first end and a second end; said first end of said roller holding section having a pivoting means thereon; said pivoting means on said roller holding section being connected to said pivoting means on said rigid member; said second end of said roller holding section having a shaft mounted thereon; said shaft having a roller mounted thereon;
- said roller on said second roller mounting assembly engages said second horizontal track means;
- a horizontal door support member that extends in substantially a horizontal orientation across said topper rear opening, between said topper first side wall and said topper second side wall; said horizontal door support member being fastened to said topper enclosure near said topper top wall; said horizontal door support member being fastened to said topper enclosure near said topper rear opening;
- said retractable door being movable between a closed position and an open position;
- in said closed position, said retractable door covers said topper rear opening;
- when said retractable door is in said closed position, said rigid member on said first roller mounting assembly is positioned on the top of said horizontal support member;
- when said retractable door is in said closed position, said rigid member on said second roller mounting assembly is positioned on the top of said horizontal support member;
- when said retractable door in said open position said retractable door is stored in substantially a horizontal position under said topper top wall;
- when said retractable door is in said open position said retractable door top is supported by said roller on said first roller mounting assembly and said first horizontal track means;
- when said retractable door is in said open position said retractable door top is supported by said roller on said second roller mounting assembly and said second horizontal track means;
- when said retractable door is in said open position said inner surface of said retractable door contacts said horizontal door support member;
- when said retractable door is in said open position said horizontal door support member supports said retractable door in substantially a horizontal position under said topper top wall;
- said topper having a retaining device that retains said retractable door in said open position.

19. The topper of claim 18 wherein said roller holding section on said first roller mounting assembly is in substantially a horizontal orientation when said retractable door is in said open position; and wherein said roller holding section on said second roller mounting assembly is in substantially a horizontal orientation when said retractable door is in said open position.

20. A topper with a retractable door for attaching to the bed of a pickup truck comprising:
- a topper enclosure that can be fastened over the bed of a pickup truck;
- said topper enclosure having a topper top wall, a topper front wall, a topper first side wall, a topper second side wall, and a topper rear opening; said topper rear opening having a predetermined height and width;
- a retractable door that has a predetermined height and width; said retractable door having a door top, a door bottom, a door first side, a door second side, a door inner surface, and a door outer surface; said retractable door being sized to mate with said topper rear opening;
- a first horizontal track means that is fastened to said topper enclosure; and a
- second horizontal track means that is fastened to said topper enclosure;
- a first roller mounting assembly and a second roller mounting assembly;
- said first roller mounting assembly having a rigid member and a roller holding section; said rigid member having a first end and a second end; said first end of said rigid member being securely fastened to said retractable door near said door top; said second end of said rigid member having a pivoting means thereon; said roller holding section having a first end and a second end; said first end of said roller holding section having a pivoting means thereon; said pivoting means on said roller holding section being connected to said pivoting means on said rigid member; said second end of said roller holding section having a shaft mounted thereon; said shaft having a roller mounted thereon;
- said roller on said first roller mounting assembly engages said first horizontal track means;
- said second roller mounting assembly having a rigid member and a roller holding section; said rigid member having a first end and a second end; said first end of said rigid member being securely fastened to said retractable door near said door top; said second end of said rigid member having a pivoting means thereon; said roller holding section having a first end and a second end; said first end of said roller holding section having a pivoting means thereon; said pivoting means on said roller holding section being connected to said pivoting means on said rigid member; said second end of said roller holding section having a shaft mounted thereon; said shaft having a roller mounted thereon;
- said roller on said second roller mounting assembly engages said second horizontal track means;
- a horizontal door support member that extends in substantially a horizontal orientation across said topper rear opening, between said topper first side wall and said topper second side wall; said horizontal door support member being fastened to said topper enclosure near said topper top wall; said horizontal door support member being fastened to said topper enclosure near said topper rear opening;
- said retractable door being movable between a closed position and an open position;
- in said closed position, said retractable door covers said topper rear opening;
- when said retractable door is in said closed position, said rigid member on said first roller mounting assembly is positioned on the top of said horizontal support member;
- when said retractable door is in said closed position, said rigid member on said second roller mounting assembly is positioned on the top of said horizontal support member;
- when said retractable door in said open position said retractable door is stored in substantially a horizontal position under said topper top wall;
- when said retractable door is in said open position said retractable door top is supported by said roller on said first roller mounting assembly and said first horizontal track means;
- when said retractable door is in said open position said retractable door top is supported by said roller on said second roller mounting assembly and said second horizontal track means;
- when said retractable door is in said open position said inner surface of said retractable door contacts said horizontal door support member;
- when said retractable door is in said open position said horizontal door support member supports said retractable door in substantially a horizontal position under said topper top wall;
- said topper having a lock device that locks said retractable door in said closed position;
- said rigid member on said first roller mounting assembly is in substantially a vertical orientation when said retractable door is in said open position; and said rigid member on said second roller mounting assembly is in substantially a vertical orientation when said retractable door is in said open position.

* * * * *